United States Patent [19]

Kawabata

[11] Patent Number: 4,504,135
[45] Date of Patent: Mar. 12, 1985

[54] AUTOMATIC FOCUSING DEVICE

[75] Inventor: Takashi Kawabata, Kamakura, Japan

[73] Assignee: Canon Kabushiki Kaisha, Tokyo, Japan

[21] Appl. No.: 566,164

[22] Filed: Dec. 28, 1983

[30] Foreign Application Priority Data

Jan. 10, 1983 [JP] Japan .................................. 58-2398

[51] Int. Cl.³ .............................................. G03B 3/00
[52] U.S. Cl. .................................. 354/402; 354/195.1
[58] Field of Search .................... 354/402, 409, 195.1, 354/195.13

Primary Examiner—Russell E. Adams

Attorney, Agent, or Firm—Fitzpatrick, Cella, Harper & Scinto

[57] ABSTRACT

An automatic focusing device of a camera capable of photo-taking in infrared ray has means for detecting a focus condition of an imaging lens and correction means for producing information representing a difference between a focusing point of an image formed by a visible ray and a focusing point of an image formed by an infrared ray. The imaging lens is selectively moved to an in-focus position for the visible ray or an in-focus position for the infrared ray based on the focus information from the focus detection means and the correction information from the correction means.

7 Claims, 2 Drawing Figures

AUTOMATIC FOCUSING DEVICE

BACKGROUND OF THE INVENTION

1. Field of the Invention

The present invention relates to an automatic focusing device of a camera capable of photo-taking in infrared ray.

2. Description of the Prior Art

An imaging lens of a camera usually correct color aberration within a range of a visible ray. Accordingly, in the case of infrared ray photographing, a focal plane is moved behind that for the visible ray. Thus, when an infrared film is loaded in the camera to photograph an object by the infrared ray, it is necessary to move the imaging lens forward by a distance corresponding to a deviation of the focal plane from an in-focus point for the visible ray in order to obtain a sharp image. When the infrared film is loaded in a camera having an automatic focusing device, it is necessary to correct the focusing operation of the imaging lens effected by the automatic focusing device.

When the automatic focusing device having the correction function to the infrared ray is incorporated in a single-lens reflex camera in which an observation image and a photographing image are formed by an imaging lens, the image by the visible ray on a finder is not focused on a pint glass because the imaging lens is moved to focus the image by the infrared ray on the film. Accordingly, a user cannot observe an in-focus object image through the finder.

Further, since the deviation of the focal plane for the infrared ray differs depending on the type of the imaging lens, the exchange of the lens is not permitted in the camera having such a device.

SUMMARY OF THE INVENTION

It is an object of the present invention to provide an automatic focusing device capable of adjusting focus of an imaging lens for both the visible ray and the infrared ray.

It is another object of the present invention to provide an automatic focusing device for a camera which forms an observation image and a photographing image by an imaging lens, which device allows an in-focus object image to be observed in the case of infrared ray photographing.

It is other object of the present invention to provide an automatic focusing device capable of adjusting focus of an imaging lens for the infrared ray and the visible ray whatever imaging lens may be used.

The other objects of the present invention will be apparent from the following description of the embodiments.

DETAILED DESCRIPTION OF THE PREFERRED EMBODIMENTS

Figure 1:
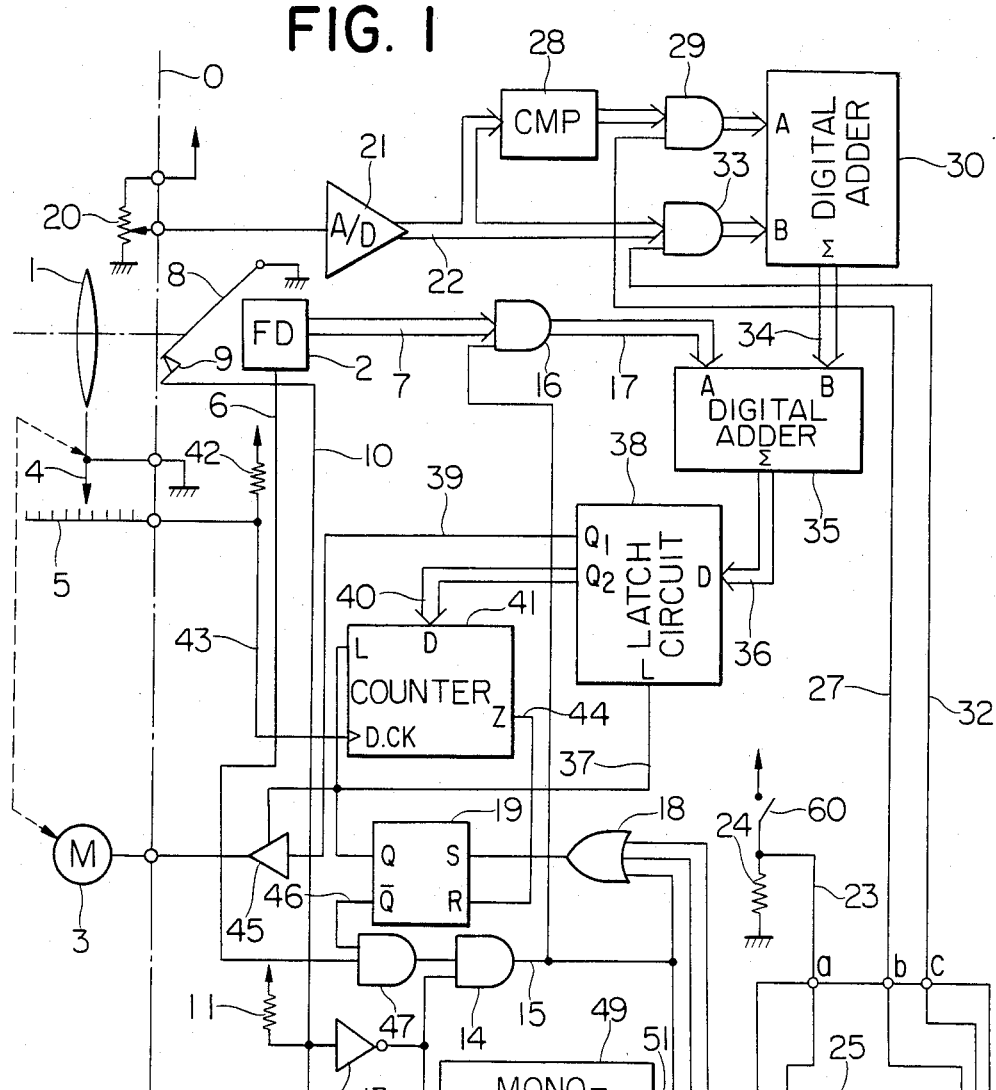
FIG. 1 is a circuit diagram of one embodiment of the automatic focusing device of the present invention.

Referring to FIG. 1, the lefthand side of a chain line 0 shows the lens barrel and a righthand side shows a camera body of a single-lens reflux camera. When the lens barrel which is removable from the camera body is mounted on the camera body, a circuit shown in FIG. 1 is constructed through connection terminals.

In FIG. 1, an imaging lens 1 is driven by a focusing motor 3. In order to detect a distance of movement of the imaging lens 1, a bruch 4 linked to the lens 1 slides on a distance detection pattern 5 arranged on the lens barrel and cooperates with a pull-up resistor 42 to produce pulses as the lens 1 is moved along an optical axis. Numeral 20 denotes correction setting means having a voltage divider for generating a voltage representing a focus correction distance of the imaging lens 1 mounted on the camera body, for the infrared ray. The means so automatically sets the amount of correction by an electrical connection when the lens is exchanged, or the amount of correction may be manually set when the lens is exchanged. When a zoom lens is used, the amount of correction is changed in accordance with the degree of zooming.

An object image from the imaging lens 1 is reflected by a quick-return mirror 8 and directed to a pint glass (not shown) in a finder optical path. The object image of the visible ray focused on the pint glass is observed by an operator through an eye lens (not shown). Focus detection unit 2 is a known detection unit which detects a focusing state of the imaging lens 1 for the infrared ray by receiving the infrared ray, and it is arranged in the finder optical path or an imaging optical path to receive the light from the imaging lens 1. The focus detection unit 2 produces a data defining signal pulse (high level) to an output line 6 each time when a data representing the amount of defocus of the lens 1 is defined, and also produces an amount of defocus data to an output line 7 as a digital signal of a predetermined number of bits. When the quick-return mirror 8 is at the illustrated position, a mirror switch 9 is in a closed position and a mirror signal line 10 connected to the switch 9 is at a low level through a pull-up resistor 11. Accordingly, during this period, an inverter 12 produces a high level signal on an output line 13 and an AND gate 14 is opened. At this time, a set-reset flip-flop (RS-FF) 19 is in a reset state and a $\overline{Q}$-output thereof is high level so that and AND gate 47 is opened. Accordingly, the data defining signal from the focus detection unit 2 is gated to a signal line 15 through the AND gates 47 and 14. The data defining signal sets the RS-FF 19 through an OR gate 18 to activate an amplifier 45. As a result, the motor 3 is driven in accordance with the amount of defocus to focus the lens 1, as will be explained later.

The correction setting means 20 generates a signal voltage indicating the amount of focus correction for the infrared ray depending on the type of the imaging lens 1 used. This voltage is converted to a digital signal of a predetermined number of bits by an A/D converter 21. This digital signal is converted to a signal of opposite polarity (for example, from positive to negative) by a digital complementer 28 and it is applied to a gate circuit 29 having a plurality of AND gates one for each line of the digital signal. The digital signal from the A/D converter 21 is also applied to a gate circuit 33 having a plurality of AND gates. Numeral 60 denotes a switch which is closed when an infrared film is loaded in the camera. When the switch 60 is open, a signal line 23 is at low level through a pull-down resistor 24. Thus, in the normal photographing mode in which the infrared film is not used, the signal line 23 is at low level, outputs of AND gates 25 and 26 are at low level, and when the data defining signal is present on the signal line 15, the high level signal is applied to the gate circuit 29 through an OR gate 31 and a signal line 27. As a result, the gate circuit 29 is opened by the data defining signal, that is, at a timing of completion of ranging so that the output of the digital complementer 28 which comprises a plurality of inverters is supplied to a digital adder 30. Since the output line 32 of the AND gate 26 is at low level, the gate circuit 33 is closed and the digital adder 30 supplies the inverted digital infrared correction data to a sum output line 34. Since the data defining signal from the signal line 15 is also applied to a gate circuit 16 which comprises a plurality of AND gates, the gate circuit 16 is opened at the timing of completion of ranging and the data signal on the line 7 representing the amount of defocus is outputted to the output line 17. The digital signals on the signal lines 17 and 34 are summed by the digital adder 35, which produces a corrected data signal for the visible ray, that is, a data signal corrected for the visible ray based on the distance data for the infrared ray, on a signal line 36.

As described above, the RS-FF 19 is set when the data is defined to produce the high level $\bar{Q}$-output, which causes a latch circuit 38 to latch the defocus data signal corrected for the visible ray, through a signal line 37. The latch circuit 38 produces a high level or low level signal on an output line 39 depending on whether the defocus data signal is positive or negative, and produce the defocus data signal in an absolute value on an output line 40. The polarity of the defocus data signal changes depending on whether the lens 1 is in near-focus or far-focus. A presettable down-counter 41 reads in the defocus data signal from the output line 40 by the high level signal on the signal line 37 and counts it down by a pulse signal produced on a signal line 43 by the brush 4, the detection pattern 5 and the pull-up resistor 42 as the imaging lens 1 is moved. When the lens 1 has been moved by a distance corresponding to the defocus data and the defocus data signal is no longer present, the counter 41 produces a high level signal on an output line 44 to reset the RS-FF 19.

Thus, when the signal line 37 assumes the high level by the setting of the RS-FF 19, the amplifier 45 is activated and the motor 3 is rotated forwardly or reversely depending on whether the signal supplied from the latch circuit 38 to the signal line 39 is at the high level or low level, and the motor 3 is stopped when the output line 44 of the counter 41 assumes the high level. While the lens is driven, the $\bar{Q}$-output of the RS-FF is at the low level and the AND gate 47 is closed. Accordingly, the distance data is neglected during the drive of the lens.

In this manner, through the repetition of set and reset of the RS-FF 19, the lens 1 is repeatedly driven as the distance data is defined and the lens 1 is moved to the in-focus point for the visible ray.

The focusing operation of the imaging lens 1 before the mirror is lifted, that is, during the observation of the object through the finder when the infrared film is not used but the ordinary film is used has thus far described.

The drive of the imaging mirror 1 in the photographing operation, that is, after the mirror has been lifted is now explained.

Monostable multivibrators 48 and 49 produce pulses of a given width on output lines 50 and 51, respectively, when the input lines 10 and 13 rise to the high level, that is, when the mirror is lifted and falls, respectively, to set the RS-FF 19 through the OR gate 18. Thus, when the quick-return mirror 8 is lifted and the signal line 10 assumes the high level by the mirror switch 9 opened by the lifting of the mirror 8 and the pull-up resistor 11, the monostable multivibrator 48 produces the pulse of the given width. The inverter 12 produces a low level signal. As a result, the AND gate 14 produces a low level output and the gate circuit 16 and the OR gate 31 also produce the low level outputs. Accordingly, although the RS-FF 19 is set by the high level output of the output line 50 of the monostable multivibrator 48, the gate circuits 29, 33 and 16 each of which comprises a plurality of AND gates do not produce the data signal, and the motor 3 is not driven.

In this case, it is not necessary to drive the lens 1 because the focusing error for the visible ray due to the distance measurement by the infrared ray has already been corrected and the photographing film is the ordinary film which is primarily sensitive to the visible ray.

When the mirror 8 has fallen and the signal line 13 assumes the high level, the output of the AND gate 14 remains low level because the data defining signal is not present on the signal line 6.

The operation when the infrared film is used is now explained.

The switch 60 is first closed. Before the mirror is lifted, that is, while the object is observed through the finder, the signal lines 50 and 51 are at the low level and the AND gates 25 and 26 produce the low level signals. Accordingly, the lens 1 is driven in the same manner as that when ordinary film is used. That is, the lens 1 is moved to the in-focus point for the visible ray.

When the photographing operation is started in the in-focus state of the imaging lens 1 for the visible ray, the signal line 50 assumes the high level by the rise of the mirror and the RS-FF 19 is set and the AND gate 26 produces the high level output on the output line 32. Since the output line 27 of the OR gate 31 is at the low level at this time, the digital adder 30 produces the output of the gate circuit 33, that is, the digital signal representing the amount of focus correction of the lens 1 by the infrared ray to the output line 34. Since the defocus data signal from the signal line 17 is not applied to the digital adder 35 because of the low level output of the AND gate 14, the digital signal from the line 34 is outputted as it is on the output line 36. This digital signal is latched by the latch circuit 38 and the motor 3 is driven. The distance of movement of the lens 1 and the amout of focus correction for the infrared ray are compared by the presettable down-counter 41, and when they coincide, the RS-FF 19 is reset to stop and motor 3. In this manner, the imaging lens 1 is moved to the in-focus point for the infrared film. Thereafter, the shutter is driven to make an exposure and the mirror 8 is fallen. As the mirror 8 is fallen, the signal line 50 assumes the low level and the signal line 51 assumes the high level, and the high level output of the AND gate 25 is applied to the gate circuit 29 through the OR gate 31. Thus, the adder 30 supplies the digital infrared ray correction signal of the opposite polarity from the AND gate 29 to the adder 35. Since the signal line 6 is at the low level at this time, the output of the AND gate 14 is at the low level and the output line 17 of the gate circuit 16 is also at the low level. Thus, the adder 35 supplies the infrared ray correction signal of the opposite polarity to the output line 36 and the latch circuit 38 latches it and the lens 1 is again driven to the in-focus point for the visible ray. Accordingly, the operator can observe the in-focus object image after the photographing operation.

Figure 2:
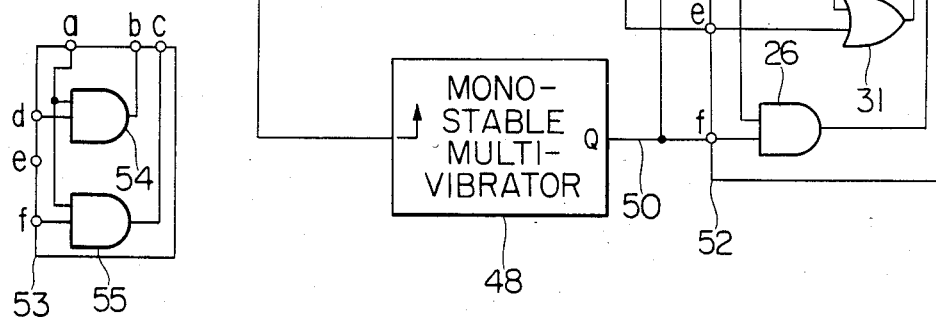
FIG. 2 is a circuit diagram of a major portion of another embodiment of the present invention.

FIG. 2 shows a modification of the control unit 52 of FIG. 1 which comprises the AND gates 25 and 26 and the OR gate 31. A control unit 53 shown in FIG. 2 comprises AND gates 54 and 55, and it is used when the focus detection unit 2 measures the distance by the visible ray and produces the defocus data signal for the visible ray.

When ordinary film is used, the signal line 23 and a connection terminal a are always at the low level because the switch 60 is opened, and hence connection terminals b and c are also always at the low level. Accordingly, the AND gates 29 and 33 are always closed and the focusing operation of the lens 1 necessary for the measurement of distance by the infrared ray is not conducted during the observation period and the photographing period.

However, when infrared film is used, the switch 60 is closed and the connection terminal a always assumes the high level and the high level signal on the signal line 50 due to the rise of the mirror 8 is supplied to the signal line 32 through the AND gate 55. Thus, the focusing operation by the infrared ray is effected, and after the photographing operation, the imaging lens 1 is returned to the in-focus point for the visible ray by the high level signal on the signal line 51 due to the fall of the mirror, through the AND gate 54.

While the correction setting means 20 for the lens 1 produces the analog signal in the illustrated embodiment, the present invention is not limited thereto and correction setting means which produces a digital signal may also be used. In this case, the A/D converter 21 is not necessary.

When the in-focus state is to be displayed, the correction data on the signal line 36 or 40 may be latched at the timing of the distance signal on the signal line 15 and it may be displayed by an analog or digital display so that a corrected in-focus state is displayed.

As described hereinabove, in accordance with the present invention, since the focusing operation is carried out by the amount of focus correction for the infrared ray from the lens, an exact focusing control is attained in a system in which the measurements of distance by the visible ray and the infrared ray are used in combination. When the imaging lens is exchanged or the zoom lens is used, the exact correction is attained, and when the infrared film is used, the imaging lens is driven to the in-focus point for the visible ray during the observation by the finder and driven to the in-focus point for the infrared ray during the photographing operation. Accordingly, the camera incorporating the present invention is easy to use.

What I claim is:

1. An automatic focusing device comprising:
   (a) focus detection means for producing information representing a focusing state of an object lens;
   (b) correction means for producing information representing a difference between a focus point of an image formed by a visible ray transmitted through said object lens and a focus point of an image formed by an infrared ray; and
   (c) focusing means for focusing said object lens, said focusing means selectively moving said object lens to an in-focus point for the visible ray or an in-focus point for the infrared ray based on the information from said focus detection means and the information from said correction means.

2. An automatic focusing device of a camera for forming an observation image and a photographing image through an imaging lens, comprising:
   (a) focus detection means for producing information representing a focus state of said imaging lens;
   (b) correction means for producing information representing a difference between a focus point of an image formed by a visible ray transmitted through said imaging lens and a focus point of an image formed by an infrared ray; and
   (c) focusing means for focusing said imaging lens, said focusing means moving said imaging lens to an in-focus point for the visible ray when said camera is in an image observation mode and moving said imaging lens to an in-focus point for the infrared ray when said camera is in a photographing mode, based on the information from said focus detection means and the information from said correction means.

3. An automatic focusing device according to claim 2 further comprising:
   (d) switch means adapted to be switched to a first state when said camera is operated in a visible ray photographing mode and to a second state when said camera is operated in an infrared ray photographing mode; and
   inhibit means for inhibiting focusing operation of said imaging lens for the infrared ray by said focusing means when said switch means is switched to said first state.

4. An automatic focusing device according to claim 2 wherein said focusing means starts the focusing operation of said imaging lens for the infrared ray when reflection means of said camera starts to move from a first position to observe the image to a second position to photograph the image.

5. An automatic focusing device according to claim 4 wherein said focusing means starts the focusing operation of said imaging lens for the visible ray when said reflection means completes the return from said second position to said first position.

6. An automatic focusing device according to claim 5 wherein said focusing means includes control means for controlling a distance of movement of said imaging lens based on input information thereto, said control means receiving the information from said correction means when the movement of said reflection means from said first position to said second position is started and receiving the inversion of the information from said correction means when the return of said reflection means from said second position to said first position is completed.

7. An automatic focusing device according to claim 2 wherein said correction means is located at said imaging lens removably mounted on a camera body and supplies the information to said focusing means when said imaging lens is mounted on said camera body.

* * * * *